United States Patent
Liu et al.

(10) Patent No.: US 7,195,742 B2
(45) Date of Patent: Mar. 27, 2007

(54) PREFERENTIAL OXIDATION REACTOR AND PROCESS

(75) Inventors: Ke Liu, East Longmeadow, MA (US); Sean C. Emerson, Windsor, CT (US); Richard James Bellows, Ellington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 451 days.

(21) Appl. No.: 10/207,704

(22) Filed: Jul. 26, 2002

(65) Prior Publication Data

US 2004/0018134 A1 Jan. 29, 2004

(51) Int. Cl.
- *B01D 50/00* (2006.01)
- *B01D 53/34* (2006.01)
- *B01D 53/94* (2006.01)
- *F28D 21/00* (2006.01)
- *B01J 7/00* (2006.01)

(52) U.S. Cl. ............... 422/181; 422/129; 422/177; 422/176; 422/171; 422/173; 422/181; 422/172; 422/202; 423/247; 423/437.2; 48/61

(58) Field of Classification Search ........ 422/171–173, 422/176–177, 181, 194, 195, 220; 423/247, 423/437.2

See application file for complete search history.

(56) References Cited

U.S. PATENT DOCUMENTS

| | | | |
|---|---|---|---|
| 5,271,916 A | 12/1993 | Vanderborgh et al. | |
| 5,330,727 A | 7/1994 | Trocciola et al. | |
| 5,637,415 A | 6/1997 | Meltser et al. | |
| 5,874,051 A * | 2/1999 | Heil et al. | 422/171 |
| 5,997,826 A | 12/1999 | Lodeng et al. | |
| 6,132,689 A | 10/2000 | Skala et al. | |
| 6,265,092 B1 | 7/2001 | Meltser et al. | |
| 6,403,041 B1 | 6/2002 | Takahashi et al. | |
| 2002/0090334 A1 * | 7/2002 | Stevens et al. | 423/247 |

FOREIGN PATENT DOCUMENTS

WO   WO 01/83365 A2   11/2001

OTHER PUBLICATIONS

Michael A. Inbody, Rodney L. Borup, James C. Hedstrom, Jose Tafoya, Byron Morton, Transient Carbon Monoxide Control For PEMFC Automotive Applications—Publication, no date.

* cited by examiner

*Primary Examiner*—Glenn Caldarola
*Assistant Examiner*—Kaity Handal
(74) *Attorney, Agent, or Firm*—Bachman & LaPoint, P.C.

(57) ABSTRACT

An apparatus for preferential oxidation of carbon monoxide in a reformate flow includes a reactor defining a flow path for a reformate flow; at least one catalyst bed disposed along the flow path; and a distributor for distributing oxygen from an oxygen source to the at least one catalyst bed, the distributor including a conduit positioned at least one of upstream of and through the at least one catalyst bed, the conduit having a sidewall permeable to flow of oxygen from within the conduit to the at least one catalyst bed.

19 Claims, 3 Drawing Sheets

PREFERENTIAL OXIDATION REACTOR AND PROCESS

BACKGROUND OF THE INVENTION

The present invention relates to preparation of fuel for a fuel cell power plant and, more particularly, to a preferential oxidation reactor and process whereby carbon monoxide in a reformate stream is converted to carbon dioxide.

Proton exchange membrane (PEM) fuel cells and PEM fuel cells stacks use hydrogen for fuel. It is conventionally quite difficult to obtain pure hydrogen as fuel, however, and therefore hydrogen rich gas mixtures are obtained through reforming of various hydrocarbon fuels. Hydrocarbon fuel is typically treated through a series of reactors, for example a reformer and a shift converter, and then fed as fuel to a PEM fuel cell power plant. Such processing of fuel typically results in a stream containing hydrogen as well as carbon dioxide, water, nitrogen and carbon monoxide. Carbon dioxide and water can be readily and easily removed but it is carbon monoxide removal that is key because carbon monoxide acts as a poison on the anode of PEM cells. However, conventional carbon monoxide removal processes such as pressure swing adsorption systems and the like add greatly to the expense and size of equipment needed.

Attempts to preferentially oxidize carbon monoxide in the reformate stream have been made. However, existing problems include parasitic consumption of hydrogen during this process, introduction of additional nitrogen to the reformate stream and others.

It is therefore the primary object of the present invention to provide a preferential oxidation reactor and process whereby these and other problems are overcome.

Other objects and advantages of the present invention will appear hereinbelow.

SUMMARY OF THE INVENTION

In accordance with the present invention, the foregoing objects and advantages have been readily attained.

According to the invention, an apparatus for preferential oxidation of carbon monoxide in a reformate flow is provided, which apparatus comprises a reactor defining a flow path for a reformate flow; at least one catalyst bed disposed along said flow path; and a distributor for distributing oxygen from an oxygen source to said at least one catalyst bed, said distributor comprising a conduit positioned at least one of upstream of and through said at least one catalyst bed, said conduit having a sidewall permeable to flow of oxygen from within said conduit to said at least one catalyst bed. While a tubular shape is preferred for the conduit, other shaped conduits may also be used.

In further accordance with the present invention, a process for preferential oxidation of carbon monoxide in a reformate flow to a fuel cell stack is provided, which comprises the steps of providing a reformate flow containing carbon monoxide; providing a reactor defining a flow path for said reformate flow, at least one catalyst bed disposed along said flow path, and a distributor for distributing oxygen from an oxygen source to said at least one catalyst bed, said distributor comprising a conduit positioned at least one of upstream of and through said at least one catalyst bed, said conduit having a sidewall permeable to flow of oxygen from within said conduit to said at least one catalyst bed; feeding said reformate flow along said flow path; and feeding oxygen through said conduit whereby said oxygen contacts said carbon monoxide and said carbon monoxide is oxidized.

BRIEF DESCRIPTION OF THE DRAWINGS

A detailed description of preferred embodiments of the present invention follows, with reference to the attached drawings, wherein.

DETAILED DESCRIPTION

The invention relates to a preferential oxidation reactor and process wherein, advantageously, oxygen is evenly distributed through the reformate in the presence of a catalyst so as to more efficiently oxidize the carbon monoxide present in the stream, without excessive reaction with hydrogen, so as to provide a final fuel stream to the PEM fuel cell power plant which has a reduced amount of carbon monoxide and, preferably, a greater amount of hydrogen.

Figure 1:
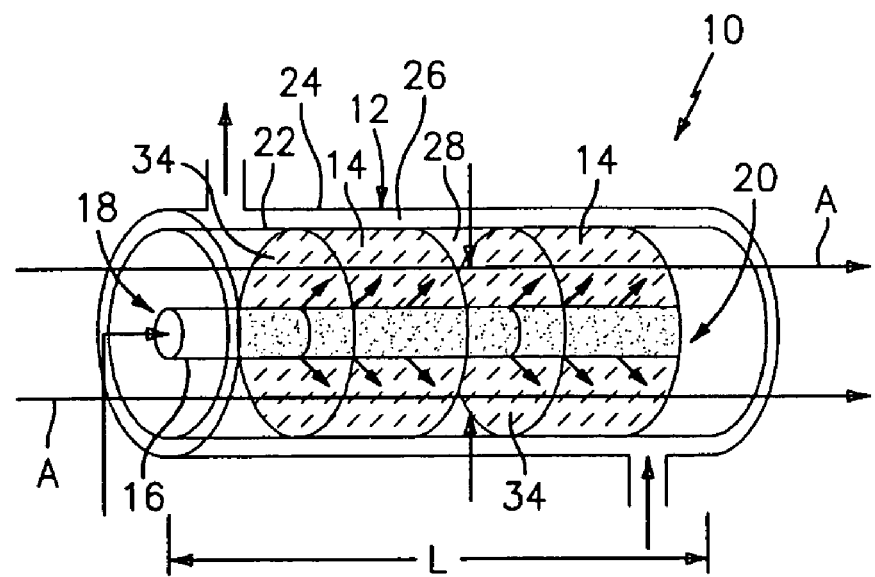
FIG. 1 schematically illustrates an apparatus in accordance with the present invention.

Turning now to the figures, FIG. 1 illustrates a preferential oxidation reactor 10 in accordance with one embodiment of the present invention. FIG. 1 schematically illustrates reactor 10 having a housing 12 defining a flow path (arrows A) for a flow of reformate to be treated before feeding to a fuel cell power plant as desired.

Reactor 10 will typically house at least one catalyst bed 14, and FIG. 1 illustrates a configuration of the present embodiment wherein two catalyst beds 14 are positioned along reactor 10 in a spaced relationship.

In further accordance with the present invention, a conduit such as element 16 is provided for distributing oxygen within reactor 10 for reaction with carbon monoxide within the reformate flow as will be further discussed below. According to the present invention, tubular element 16 is configured so as to provide for substantially uniform and even distribution of oxygen through reactor 10 which advantageously provides for more selective oxidation of carbon monoxide while also minimizing undesired burning or consumption of hydrogen. Tubular element 16 is advantageously positioned either passing through or upstream of catalyst beds 14 as described below so as to provide desirable uniform distribution of oxygen.

In the embodiment illustrated, the conduit is a tubular element. It should be appreciated that other shaped conduits can also be used, well within the scope of the present invention.

In the embodiment of FIG. 1, tubular element 16 is positioned substantially concentric with housing 12, and passing through both catalyst beds 14. In this embodiment, tubular element 16 is advantageously provided having a sidewall, or at least portions of a sidewall, which are permeable to oxygen to assist in even distribution of oxygen through reactor 10, and preferably through catalyst beds 14 where reaction with carbon monoxide within the reformate stream takes place. In accordance with the present invention, the sidewall of tubular element 16 may be rendered permeable to oxygen in several ways. In accordance with one embodiment of the present invention, the sidewall of tubular element 16 may be provided having a series of perforations or holes which allow flow therethrough. Alternatively, and as further discussed below, tubular element 16 may be provided having at least a portion of the sidewall fabricated from a permeable material, especially from a material which is selectively permeable to oxygen.

In accordance with the present invention, it has been found that a pressure drop develops in catalyst beds 14 along the flow direction of reformate therethrough. This pressure drop complicates the even distribution of oxygen throughout reactor 10, and can lead to localized excess oxygen which can undesirably react with hydrogen, rather than with the carbon monoxide to be selectively converted to carbon dioxide. In accordance with the present invention, it has been found that this pressure drop can be balanced by carefully selecting the hole size or membrane permeability of tubular element 16 such that flow through the sidewall remains substantially constant along the length of tubular element 16, thereby uniformly and evenly distributing the oxygen as desired. This can be accomplished by providing tubular element 16 with holes through the sidewalls which are greater in area at inlet end 18 than they are at outlet end 20. It is further preferable that the area of such holes gradually decrease in size per length of tubular element 16 from inlet end 18 to outlet end 20 so that flow area gradually decreases as the pressure decreases through catalyst beds 14. It should of course be appreciated that greater hole area can be provided toward inlet end 18 by utilizing holes of greater size, or by utilizing a greater concentration of holes, which in either event will provide for the desired balancing of flow area with the pressure drop as described above.

In this embodiment, wherein the sidewall of tubular element 16 is perforated to render same permeable to oxygen, it is preferable that tubular element 16 be positioned within reactor 10 such that inlet end 18 is substantially accessible for flow of oxygen, typically of air containing oxygen, and that outlet end 20 terminates a distance from the inlet of reactor 10 which is equal to between about 5 and about 100% of the length L of reactor 10. Preferably, outlet end 20 is spaced from the end of reactor 10 by a distance of about 20% of length L of reactor 10.

Still referring to FIG. 1, housing 12 may advantageously be provided as a double-shell housing, wherein inner shell 22 defines flow path A as desired, and outer shell 24 defines an annular space 26 between inner shell 22 and outer shell 24 through which heat exchange coolant can be fed if desired.

In further accordance with the present invention, catalyst beds 14 may advantageously be spaced along the length of reactor 10 as described above and as shown in FIG. 1. This spacing defines a gap 28 between beds which can advantageously be used for direct $H_2O$ injection, if desired.

Reformate flow along flow path A in accordance with the present invention may typically come from earlier fuel processing steps, and will typically come from a shift converter. This reformate flow entering reactor 10 will typically contain hydrogen, carbon dioxide, water and carbon monoxide. Feed to tubular element 16 is preferably an oxygen-containing stream, and may suitably be air. This is fed to tubular element 16 from any convenient source, and oxygen is then passed through the oxygen permeable sidewall of tubular element 16 so as to react with reformate in the presence of catalyst beds 14 so as to selectively oxidize the carbon monoxide as desired. The product from reactor 10 is a further oxidized fuel which is suitable for feed to a fuel cell stack, and which has reduced carbon monoxide and a greater hydrogen content as desired.

Reactor 10 in accordance with the present invention advantageously provides for increased selectivity and conversion of carbon monoxide, and this increased carbon monoxide selectivity reduces the amount of hydrogen burned in the reactor. This provides for an improvement in efficiency of the overall system, and also reduces the need for heat exchangers, thereby allowing reduction in size of the heat exchanger to be used in reactor 10.

Figure 2:
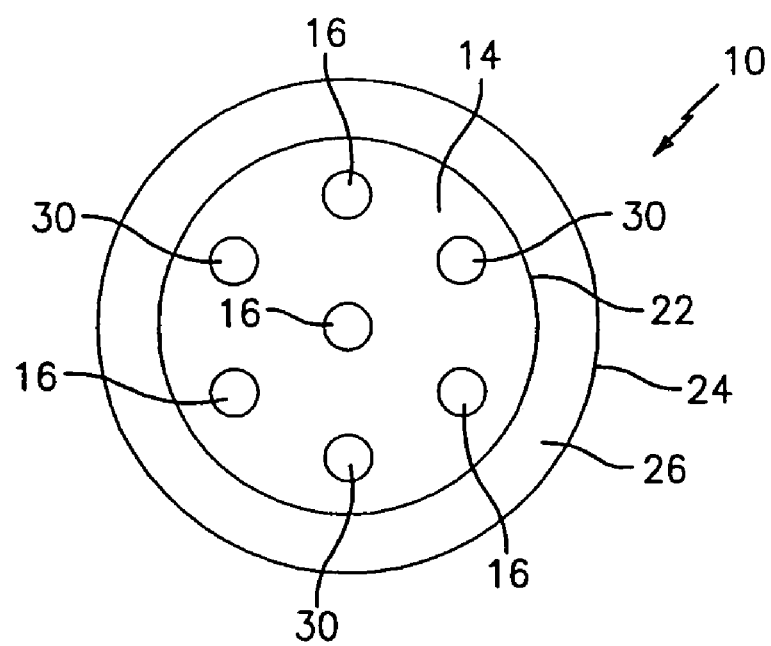
FIG. 2 schematically illustrates an end view of a reactor in accordance with an alternative embodiment of the present invention.

Turning now to FIG. 2, a schematic illustration of an end view is shown wherein, in accordance with an alternative embodiment of the present invention, a plurality of tubular elements 16 are provided passing along reactor 10 through catalyst beds 14 so as to further uniformly distribute oxygen as desired. In the embodiment of FIG. 2, the center conduit and three of the perimeter conduits are tubular elements 16 for carrying air/oxygen through reactor 10 as desired. In this embodiment, additional heat exchange coolant can further be conveyed through additional tubular members 30 as desired, thus further enhancing the efficiency of reactor 10 in accordance with the present invention as well as reducing the size of same.

FIG. 2 further illustrates the inner shell 22 and outer shell 24 as discussed above in connection with FIG. 1, as well.

Figure 3:
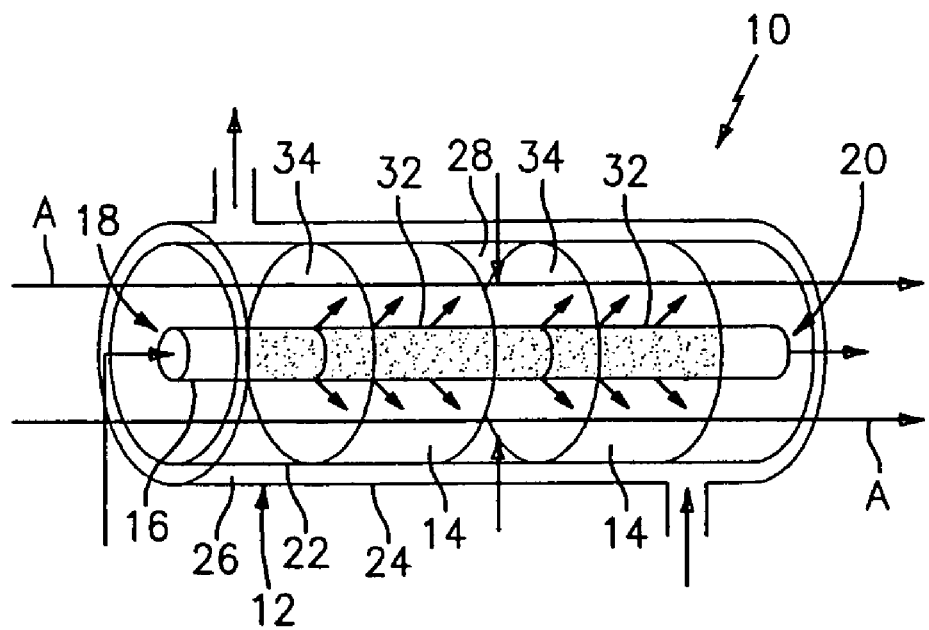
FIG. 3 schematically illustrates a further embodiment of the present invention.

Turning now to FIG. 3, a further embodiment of the present invention is illustrated wherein, rather than perforations through tubular element 16, tubular element 16 is provided with an oxygen permeable membrane along at least some portions of the sidewall, whereby oxygen is allowed to pass from within tubular element 16 to outside of tubular element 16 and into flow path A for exposure to carbon monoxide within the reformate in the presence of catalyst in catalyst beds 14 as desired. Preferably, oxygen is introduced into gaps between catalyst beds 14. Sidewall 32 having at least portions made from an oxygen selective membrane advantageously allows oxygen to pass from within tubular member 16 to outside of tubular member 16, while preventing nitrogen and other components of the air from entering the reformate stream. This advantageously allows for oxidation of carbon monoxide without addition of further non-hydrogen components to the reformate fuel.

Any membrane material for passing oxygen without passing nitrogen that is compatible with the operating environment may be used. As with the embodiment based upon physical holes through the sidewall of tubular element 16, the properties of sidewall 32 are advantageously adjusted such that permeability to oxygen is greater at the inlet end of tubular member 16 than it is at the outlet end. Matching permeability to the pressure drop advantageously allows for a substantially uniform flow of oxygen from tubular element 16 into catalyst beds 14 as desired.

The embodiment of FIG. 3 is in all other respects the same as that described above in connection with FIG. 1.

Figure 4:
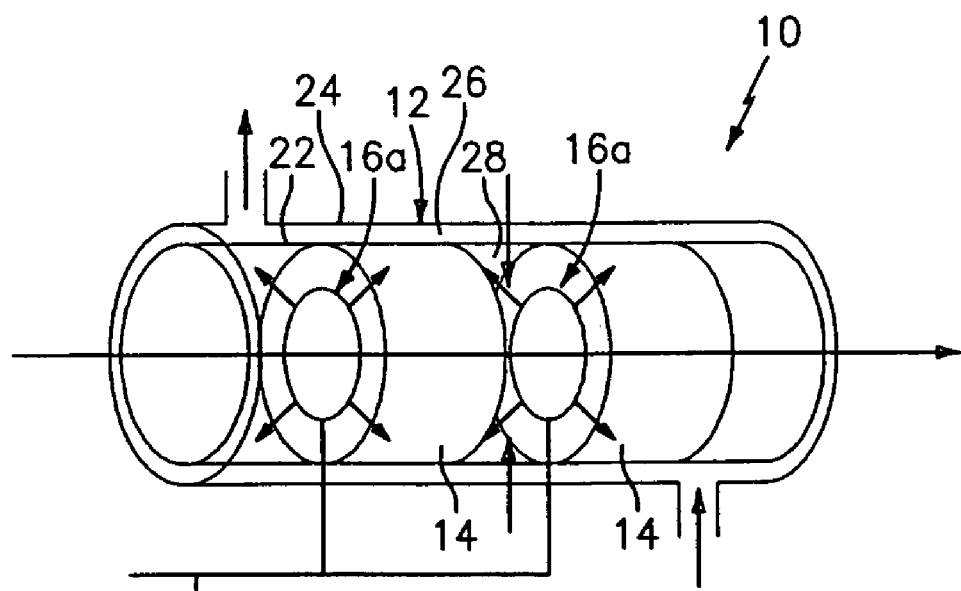
FIG. 4 schematically illustrates a further alternative embodiment of the present invention.

Turning now to FIG. 4, a further alternative embodiment of the present invention is illustrated. As shown, in this embodiment tubular elements 16a are provided in a substantially planar configuration positioned substantially adjacent to a leading or upstream surface 34 of catalyst beds 14. Tubular elements 16a of this embodiment are still provided having a sidewall which is permeable to oxygen, and this oxygen permeability can be provided in the form of physical holes in the sidewall of tubular elements 16a, or through oxygen selective membranes, and the like. In this embodiment, air flow is advantageously distributed evenly upstream of and across the front surface of catalyst bed 14. In this embodiment, radial injection speed or momentum of the air combined with axial flow of the reformate can be adapted so as to generate a uniform distribution of air across the catalyst bed as desired.

Figure 5:
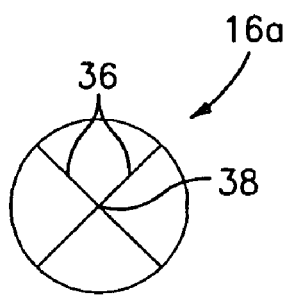
FIGS. 5–7 schematically illustrate alternative configurations for the tubular member of an embodiment as illustrated in FIG. 4.
Figure 6:
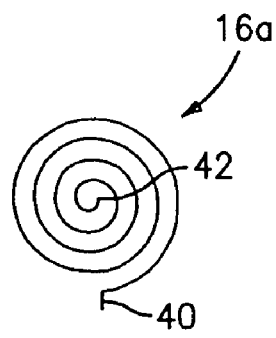
Figure 7:
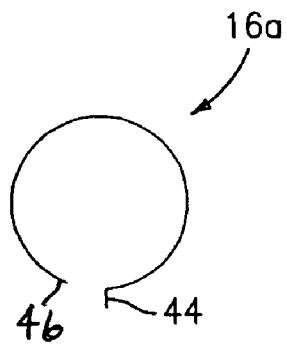

Tubular elements 16a of FIG. 4 can advantageously be bent or formed into any desired configuration. FIGS. 5–7 illustrate several preferred embodiments.

FIG. 5 illustrates an embodiment wherein tubular element 16a is formed as an outer ring with cross sections 36 which can advantageously be positioned so as to be fed from a single air feed line passing through centers 38 thereof.

The embodiment of FIG. 6 involves bending tubular elements 16a into a spiral configuration wherein feed of air can be introduced at outer end 40 or at central end 42. In either embodiment, the spiral nature of tubular element 16a will further advantageously serve to spread air and oxygen over the entire upstream surface 34 of catalyst beds 14 as desired.

FIG. 7 illustrates the simplest configuration of this embodiment wherein tubular element 16a is formed as a simple ring having two ends 44, 46 one end 44 of which is adapted for connection to a single feed line 48 as illustrated in FIG. 4.

As set forth above, tubular elements 16, 16a can be provided with oxygen permeable sections by precision machining holes of the desired size in various locations thereon. Alternatively, and also as set forth above, tubular elements 16, 16a can be provided with portions of material which are selectively permeable to oxygen. As a further alternative, tubular elements 16, 16a can be made from a porous metal with sections of different porosity along the reactor length. In any case, the main approach is to match permeability with the pressure drop along the bed to obtain a desired uniform air distribution throughout the reactor. The porous metal, precision-drilled hole or oxygen selective permeable membrane approaches as discussed above can be applied to any of the embodiments disclosed herein.

Catalyst beds 14 are typically provided of any suitable catalyst for enhancing oxidation of carbon monoxide to form carbon dioxide. Suitable catalysts include precious metals (e.g. Pt, Pd, Ru, Au, Ag, Rh and combinations thereof) preferably on oxide supports such as alumina. Such catalyst can be provided as pellets, foam or in any other suitable configuration. Arranging beds within reactor 10 with a gap 28 positioned therebetween advantageously allows for introduction of air before each catalyst bed 14, which may be particularly desirable in situations where oxygen cannot be expected to flow radially from tubular elements 16, for example in the case of a monolith catalyst. In addition, positioning of gaps 28 between beds 14 allows for direct injection of small amounts of water between the beds, as discussed above, to further replace or avoid the need for additional heat exchangers and the like.

In connection with a further embodiment of the present invention, it may desirable to provide a control member for controlling the air flow through tubular elements 16, 16a so as to conform to potentially varying reformate flow rates. For example, reformate may be fed to the fuel cell power plant or other device using such fuels at three different power levels, for example, 10%, 50% and 100% of the maximum design flow rate. To correspond to such a configuration, it may be desirable to incorporate a control member into the feed line for tubular elements 16, 16a so as to provide an appropriate amount of oxygen for each different reformate flow rate. In this manner, reaction within reactor 10 can be maintained at an efficient level and the chance for undesirable combustion of hydrogen, for example due to excess oxygen, can be avoided.

An alternate way to provide such control would be to incorporate a mechanism within the tubular distributor which could block off certain holes (or porous sections). In one example, this can be provided as a tube positioned within tubular elements 16, 16a, and also having certain holes or sections of permeability positioned therein. Rotation of the inner tube will align or misalign certain holes, thereby changing the flow area open for oxygen flow along the length of tubular element 16, 16a as desired.

In accordance with the present invention, it should be appreciated that a preferential oxidation reactor and process have been provided whereby oxygen is substantially uniformly distributed throughout reformate flow within the reactor in the presence of an appropriate catalyst so as to enhance reaction of carbon monoxide to carbon dioxide as desired. This enhanced uniformity of oxygen distribution advantageously reduces undesirable hydrogen consumption, providing for a more efficient reactor and reducing the heat which must be removed from the reactor, all as is desirable in accordance with the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. An apparatus for preferential oxidation of carbon monoxide in a reformate flow, comprising:
   a reactor defining a flow path for a reformate flow;
   at least one catalyst bed disposed along said flow path; and
   a distributor for distributing oxygen from an oxygen source to said at least one catalyst bed, said distributor comprising a conduit positioned through said at least one catalyst bed, said conduit having a sidewall contacting catalyst in said catalyst bed, said sidewall being selectively permeable to flow of oxygen in a location contacting said catalyst in said catalyst bed, whereby oxygen can flow, from within said conduit, through said side wall, to said at least one catalyst bed.

2. The apparatus of claim 1, wherein a plurality of holes are positioned through said sidewall whereby said sidewall is permeable to said flow of oxygen.

3. An apparatus for preferential oxidation of carbon monoxide in a reformate flow, comprising:
   a reactor defining a flow path for a reformate flow;
   at least one catalyst bed disposed along said flow path; and
   a distributor for distributing oxygen from an oxygen source to said at least one catalyst bed, said distributor comprising a conduit positioned at least one of upstream of and through said at least one catalyst bed, said conduit having a sidewall permeable to flow of oxygen from within said conduit to said at least one catalyst bed, wherein said conduit has an inlet, an outlet and a length defined therebetween, and wherein said sidewall has a greater permeability to oxygen at said inlet than at said outlet.

4. The apparatus of claim 3, wherein said permeability to oxygen decreases from said inlet to said outlet.

5. The apparatus of claim 1, wherein said conduit is arranged substantially parallel to said flow path.

6. The apparatus of claim 5, wherein said conduit passes through said at least one catalyst bed.

7. The apparatus of claim 5, wherein said conduit comprises at least two conduits arranged substantially parallel to said flow path.

8. The apparatus of claim 7, further comprising at least one additional conduit for carrying a coolant, said at least one additional conduit passing through said catalyst bed and being positioned substantially parallel to said flow path.

9. The apparatus of claim 1, wherein said reactor comprises an inner shell defining said flow path and an outer shell disposed around said inner shell to define an annular coolant flow path therebetween.

10. The apparatus of claim 1, wherein said at least one catalyst bed comprises at least two catalyst beds positioned along said flow path and spaced from each other to define a gap therebetween, and further comprising a water injection inlet positioned to inject water into said gap.

11. The apparatus according to claim 1, wherein said at least one catalyst bed is positioned along said flow path to define an upstream surface, and wherein said at least one conduit is arranged in a plane substantially parallel to and contacting said upstream surface.

12. The apparatus of claim 11, wherein said at least one conduit is substantially adjacent to said surface.

13. The apparatus of claim 11, wherein said at least one catalyst bed comprises a plurality of catalyst beds positioned along said flow path and spaced from each other so that each of said catalyst beds has an upstream surface, and wherein said at least one conduit comprises a plurality of conduits arranged substantially adjacent to said upstream surface of said plurality of catalyst beds.

14. The apparatus of claim 13, further comprising a single oxygen inlet for feeding all of said plurality of conduits.

15. The apparatus of claim 1, wherein said reactor has a reactor length, and wherein said at least one conduit is positioned along said length from an inlet of said flow path to a point spaced from the inlet of said flow path by a distance of between about 5% and about 100% of said length.

16. A process for preferential oxidation of carbon monoxide in a reformate flow to a fuel cell stack, comprising the steps of:
providing reformate flow containing carbon monoxide;
providing a reactor defining a flow path for said reformate flow, at least one catalyst bed disposed along said flow path, and a distributor for distributing oxygen from an oxygen source to said at least one catalyst bed, said distributor comprising a conduit positioned through said at least one catalyst bed, said conduit having a sidewall contacting catalyst in said catalyst bed, said sidewall being selectively permeable to flow of oxygen in a location contacting said catalyst in said catalyst bed;
feeding said reformate flow along said flow path; and
feeding oxygen through said conduit whereby said oxygen flows through said sidewall from within said conduit to said catalyst bed and contacts and oxidizes said carbon monoxide.

17. A process for preferential oxidation of carbon monoxide in a reformate flow to a fuel cell stack, comprising the steps of:
providing reformate flow containing carbon monoxide;
providing a reactor defining a flow path for said reformate flow, at least one catalyst bed disposed along said flow path, and a distributor for distributing oxygen from an oxygen source to said at least one catalyst bed, said distributor comprising a conduit positioned at least one of upstream of and through said at least one catalyst bed, said conduit having a sidewall permeable to flow of oxygen from within said conduit to said at least one catalyst bed;
feeding said reformate flow along said flow path; and
feeding oxygen through said conduit whereby said oxygen contacts said carbon monoxide and said carbon monoxide is oxidized, wherein feed of said reformate flow creates a pressure drop across said at least one catalyst bed, and wherein permeability of said sidewall is selected to decrease along said conduit so as to provide substantially uniform distribution of oxygen along said conduit.

18. An apparatus for preferential oxidation of carbon monoxide in a reformate flow, comprising:
a reactor defining a flow path for a reformate flow;
at least one catalyst bed disposed along said flow path; and
a distributor for distributing oxygen from an oxygen source to said at least one catalyst bed, said distributor comprising a conduit positioned at least one of upstream of and through said at least one catalyst bed, said conduit having a sidewall contacting catalyst in said at least one catalyst bed, said sidewall being selectively permeable to flow of oxygen in a location contacting said catalyst in said catalyst bed, whereby oxygen can flow, from within said conduit, through said side wall, to said at least one catalyst bed.

19. A process for preferential oxidation of carbon monoxide in a reformate flow to a fuel cell stack, comprising the steps of:
providing reformate flow containing carbon monoxide;
providing a reactor defining a flow path for said reformate flow, at least one catalyst bed disposed along said flow path, and a distributor for distributing oxygen from an oxygen source to said at least one catalyst bed, said distributor comprising a conduit positioned at least one of upstream of and through said at least one catalyst bed, said conduit having a sidewall contacting catalyst in said catalyst bed, said sidewall being selectively permeable to flow of oxygen in a location contacting said catalyst in said catalyst bed;
feeding said reformate flow along said flow path; and
feeding oxygen through said conduit whereby said oxygen flows through said sidewall from within said conduit to said catalyst bed and contacts and oxidizes said carbon monoxide.

* * * * *

UNITED STATES PATENT AND TRADEMARK OFFICE
CERTIFICATE OF CORRECTION

PATENT NO.       : 7,195,742 B2
APPLICATION NO.  : 10/207704
DATED            : March 27, 2007
INVENTOR(S)      : Ke Liu et al.

Page 1 of 1

It is certified that error appears in the above-identified patent and that said Letters Patent is hereby corrected as shown below:

On the Title Page (75) add the following:

Francis A. Kocum, Glastonbury, CT (US)

Signed and Sealed this

Second Day of September, 2008

JON W. DUDAS
*Director of the United States Patent and Trademark Office*